United States Patent [19]
Shipman

[11] Patent Number: 6,104,383
[45] Date of Patent: Aug. 15, 2000

[54] THUMB-ACTUATED COMPUTER POINTING-INPUT DEVICE

[76] Inventor: Dale Howard Shipman, 193 Glen Rd., Woodcliff Lake, N.J. 07675

[21] Appl. No.: 09/027,232

[22] Filed: Feb. 20, 1998

[51] Int. Cl.[7] .................................................. G09G 5/08
[52] U.S. Cl. ........................ 345/163; 345/167; 345/156; 345/157
[58] Field of Search ................................. 345/163, 167, 345/156, 157

[56] References Cited

U.S. PATENT DOCUMENTS

| | | | |
|---|---|---|---|
| D. 349,280 | 8/1994 | Kaneko | D14/114 |
| 3,835,464 | 9/1974 | Rider | 340/324 |
| 4,641,857 | 2/1987 | Gailiunas | 280/821 |
| 4,862,165 | 8/1989 | Gart | 341/20 |
| 5,414,445 | 5/1995 | Kaneko et al. | 345/163 |
| 5,446,481 | 8/1995 | Gillick et al. | 345/163 |
| 5,530,455 | 6/1996 | Gillick et al. | 345/163 |
| 5,576,733 | 11/1996 | Lo | 345/163 |
| 5,648,798 | 7/1997 | Hamling | 345/163 |
| 5,726,683 | 3/1998 | Goldsein et al. | 345/168 |
| 5,880,715 | 3/1999 | Garrett | 345/163 |

OTHER PUBLICATIONS

A copy of p. 176 from the Dec. 1997 issue of Wired Magazine showing the ORBIT trackball manufactured by Kensington.

Copies of three pages downloaded from the Logitech website © 1997 describing the Trackman Marble FX trackball.

*Primary Examiner*—Tan Nguyen
*Assistant Examiner*—Marthe Y. Marc-Coleman
*Attorney, Agent, or Firm*—Kalow & Springut

[57] ABSTRACT

A computer pointing-input device has a low risk of inducing Repetitive Stress Syndrome and Carpal Tunnel Syndrome in a user by providing thumb and hand actuated controls. A main body (16) of the device is held laterally in a hand of the user with the thumb of the hand resting on a thumb switch (21). The palm of the hand rests on the main body (16) and an outer edge of the palm of the hand rests on a hand switch (31). The thumb switch (21) is operable by a downward pressure from the user's thumb, and the hand switch (31) is operable by downward pressure from the outer side of the user's palm.

2 Claims, 5 Drawing Sheets

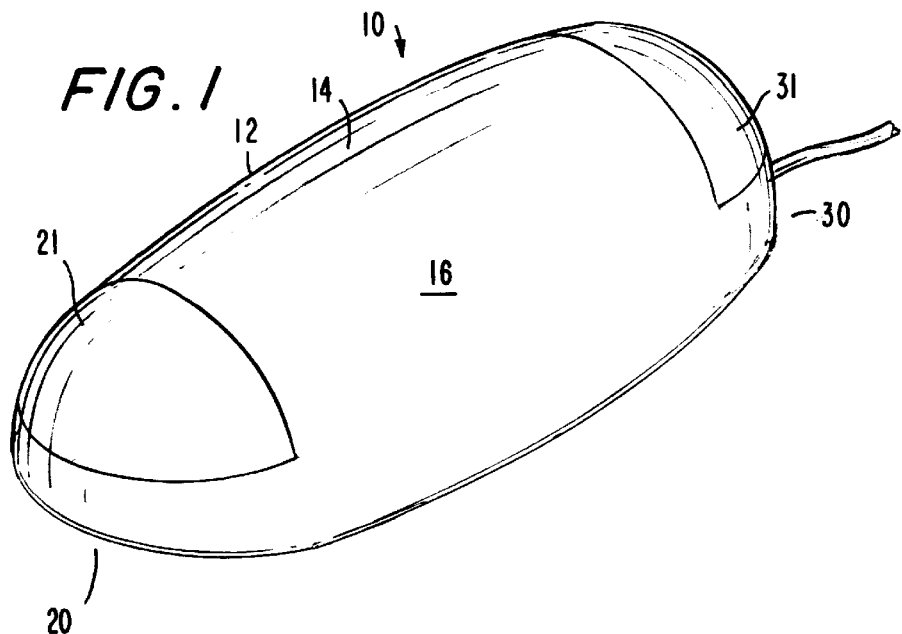
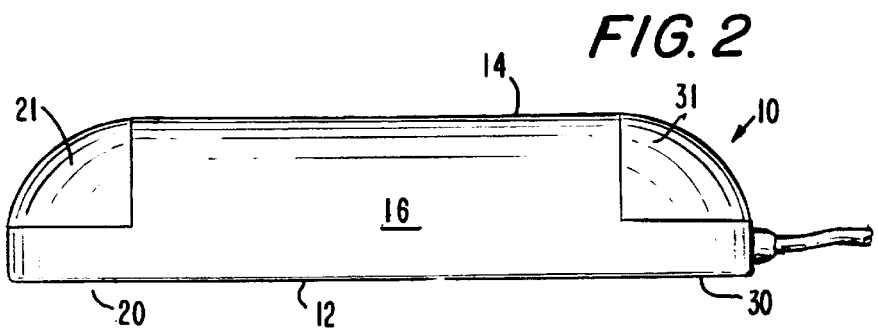
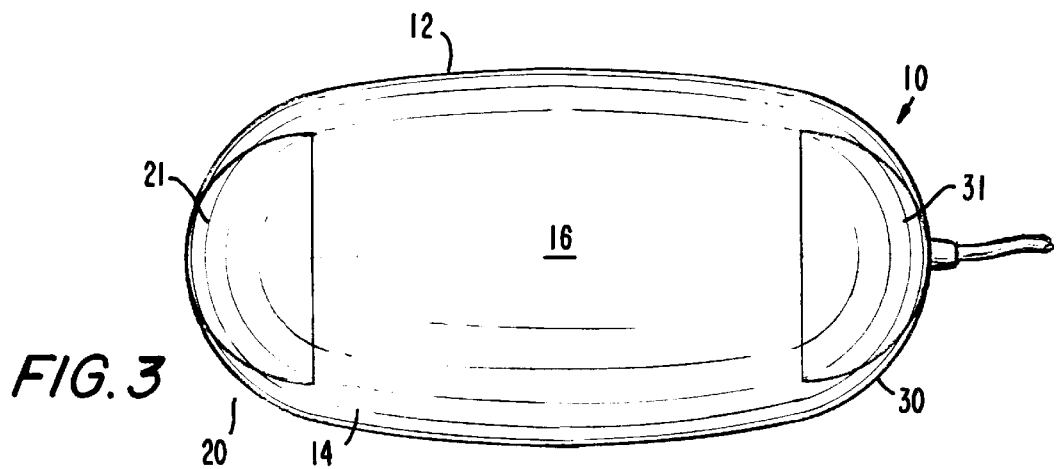

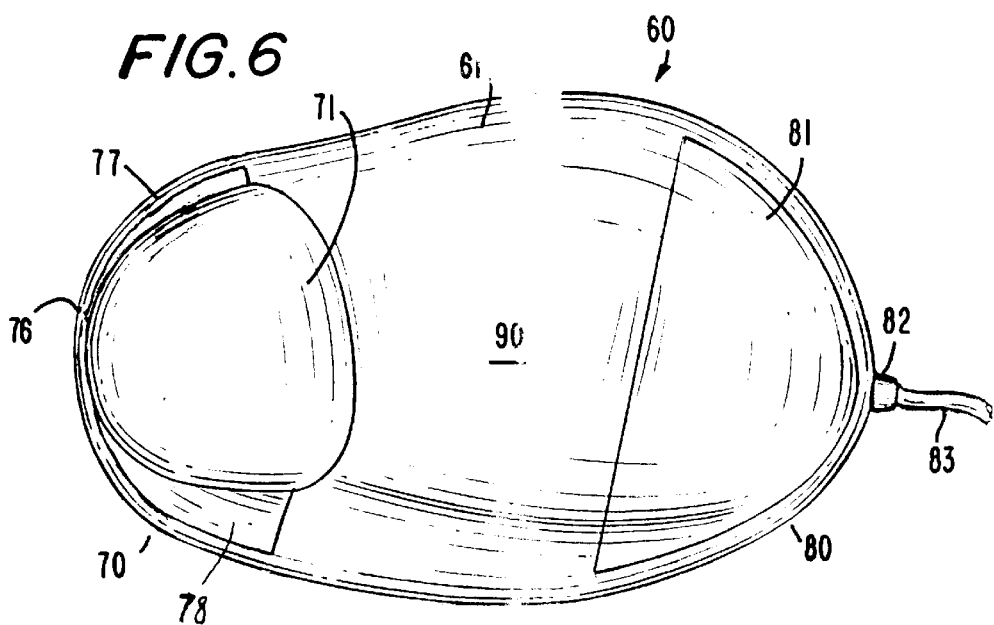
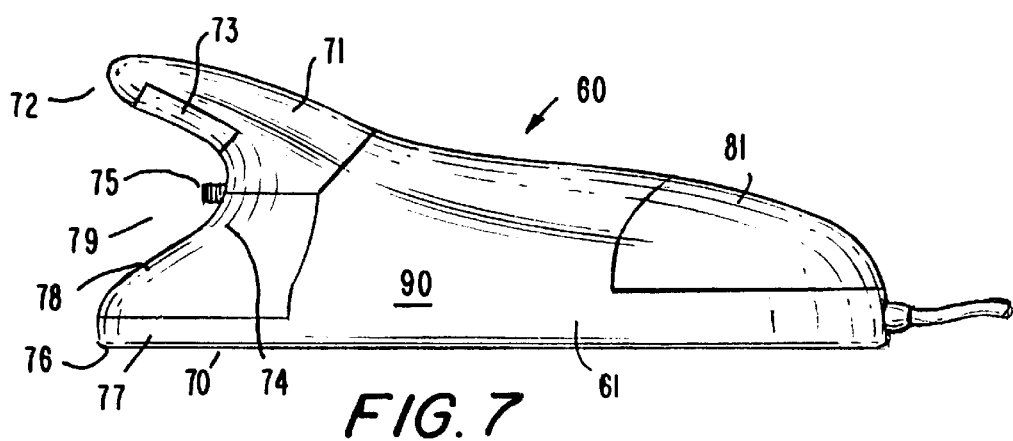

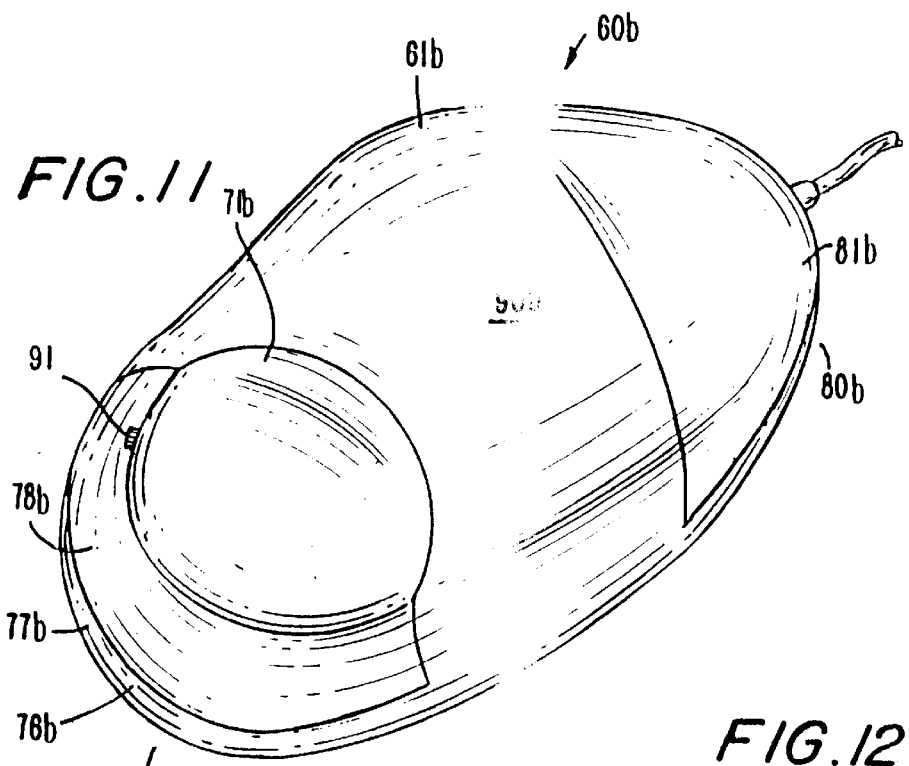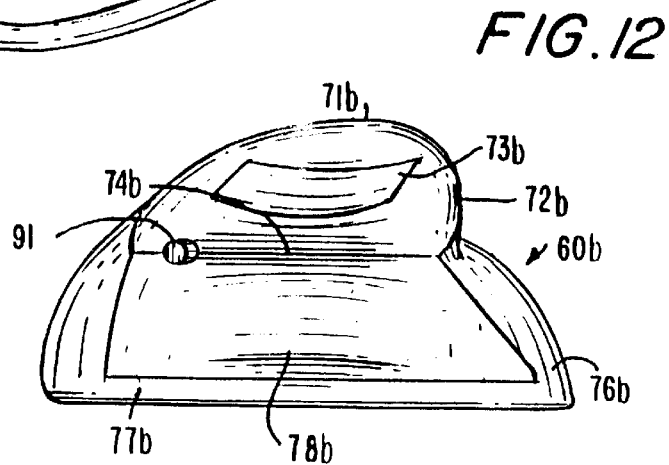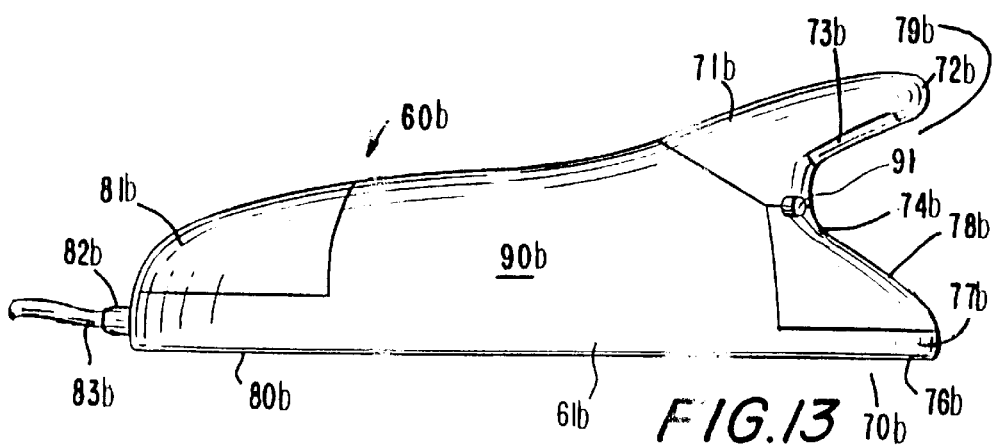

THUMB-ACTUATED COMPUTER POINTING-INPUT DEVICE

I. FIELD OF THE INVENTION

This invention relates to computer pointing-input devices, and in particular to computer pointing-input devices which reduce effort and bio-mechanical stress encountered by a user during normal operation.

II. BACKGROUND OF THE INVENTION

Computer pointing-input devices used for manipulating a wide range of controls and cursors and other objects presented to the user by windows-type operating systems and application software are well known in the art. U.S. Pat. No. 3,835,464 granted to Xerox Corporation in 1974 disclosed a hand-held computer pointing-input device generally referred to as a "mouse." Many modifications have been made to make such mouse pointing-input devices more functional, easier to use, and less stressful on the hand and arm of the user operating the device; however, the basic function of the mouse device remains substantially the same.

A conventional mouse pointing-input device has a housing which is shaped to be held by a hand of a user. This housing typically has at least one operator-manipulatable control positioned on an upper surface. The mouse pointing-input device is typically moveable over a flat surface within comfortable reach of a keyboard of a computer. Movements of the device over the surface are sensed to provide a pointing-input control signal to the computer. Various methods are known in the art to sense movement of mouse pointing-input devices. Similarly, various methods of transmitting to the computer pointing-input control signals and signals encoding the states of the operator-manipulatable controls on the mouse pointing-input device are well-known in the art.

In the future, windows-based operating systems, and the applications that run under them, will require ever greater levels of computer pointing-input device usage. However, use of conventional mouse pointing-input devices can stress the fingers, hand and arm of the user of a computer system, especially over long periods of use.

Certain conventional mouse pointing-input devices do provide device housings with ergonomically contoured shapes that support the palm of the hand and minimize wrist pronation. However, the arrangement of the operator-manipulatable controls on the surface of such a conventional device usually consists of two or three finger-actuatable controls located at an upper leading edge of the device housing. Examples of such conventional computer pointing-input devices are discussed below.

U.S. Pat. Nos. D349,280 and 5,414,445 each disclose a conventional mouse pointing-input device in which the operator-manipulatable controls consist of two finger-actuatable switches. In operation, these switches are positioned under the operator's index and middle fingers, respectively. A mouse pointing-input device commercially available from Microsoft Corporation of Redmond, Wash. under the tradename Microsoft Mouse Port Mouse also has such a two-switch layout.

A mouse pointing-input device commercially available from Microsoft Corporation under the tradename Microsoft IntelliMouse is similar in design to the Microsoft Mouse Port Mouse but includes a finger-rotatable wheel input device positioned between the two finger-actuatable switches. The wheel input device is typically used to facilitate scrolling, but can also function as a third switch.

A mouse pointing-input device commercially available from Logitech, Inc. of Fremont, California under the tradename Logitech MouseMan uses a three-switch arrangement with the three switches positioned in use under the operator's index, middle and ring fingers, respectively.

The mouse pointing-input devices of the following two paragraphs include thumb-actuatable switches.

U.S. Pat. Nos. 5,530,455 and 5,446,481 each disclose a mouse pointing-input device which incorporates three finger-actuatable switches and a wheel input device similar in operation to the one found on the Microsoft Intellimouse device. In addition, the device also has a thumb-actuatable switch positioned on a side of a body of the device. The thumb-actuatable switch in each of the pointing input devices of the '455 and '481 patents operates in a plane parallel to the surface on which the device is moved in operation. A mouse pointing-input device commercially available from Mouse Systems Corporation of Fremont, Calif. under the trade name Scroll Mouse also has such a thumb-actuatable switch.

A mouse pointing-input device commercially available from Logitech, Inc. of Fremont, Calif. under the trade name Logitech Cordless MouseMan Pro uses a three-switch arrangement similar in function to the Logitech MouseMan device discussed above, but with one switch positioned on a side of a body of the mouse for actuation by the operator's thumb. The remaining two switches of the Logitech Cordless MouseMan Pro device are positioned under the operator's index and middle fingers, respectively. Like the Scroll Mouse device, the thumb-actuatable switch in the Logitech Cordless MouseMan Pro device operates in a plane parallel to the surface on which the device is moved in operation.

While a number of conventional mouse pointing-input devices are shaped to enable the hand of the user to rest comfortably on a body of the device, such conventional devices nonetheless tend to give rise to bio-mechanical stress on the fingers, hand, wrist and arm of a user while the user is actuating the various controls. In general, the actuation of a finger-actuatable switch to generate a "Click" event requires the fingers to apply downward pressure on one or more of the switches. Bio-mechanically, generation of a click event requires the use of the flexor and extensor muscles of the fingers, which reside in the forearm and are attached to the fingers via the flexor tendons, which travel beneath the transverse carpal ligament. Constant repetitive motion can irritate the tendons as well as cause the lubricant surrounding the tendons (called the Tenosynovium) to thicken. As the swelling and thickening continue, pressure is placed upon the Carpal Tunnel, and as a result the Median Nerve is pressed directly against the Transverse Carpal Ligament. Consequently, after extended periods of use of conventional mouse pointing-input devices, it is not unusual for a user to experience a cramping sensation over the dorsum of the hand and of the forearm, and if use is continued, to experience pain.

The use of a conventional mouse pointing-input device such as the devices from Microsoft or the Logitech Mouse-Man device discussed above often proves to be stressful enough to cause "Carpal Tunnel Syndrome" and/or "Repetitive Stress Syndrome" in a user. The stress giving rise to "Carpal Tunnel Syndrome" and/or "Repetitive Stress Syndrome" is primarily due to the location of the controls which require the use of the fingers, whose tendons travel beneath the Transverse Carpal Ligament, thereby irritating the flexor tendons and placing pressure on the Median Nerve which resides within the Carpal Tunnel. Even conventional mouse pointing-input devices having thumb actuatable switches positioned on the side of the body of the device still have primary switches positioned under the fingers in use, and thus provide the operator with little, if any, relief.

The use of alternative devices such as touch pads, track balls, joy sticks, and other non-mouse type devices ordinarily tends to lead to a decrease in operator productivity, particularly among persons accustomed to using mouse pointing-input devices. Such productivity loss is ordinarily not due to pain or fatigue, but simply to the cumbersome design and usage of the non-mouse type devices.

U.S. Pat. No. 4,862,165 to Samuel Gart ("the Gart '165 patent") discloses a mouse pointing-input device shaped reportedly to reduce hand fatigue. The mouse device of the patent includes two depressible switches respectively for the forefinger and thumb. According to FIGS. 1 and 4 of the Gart '165 patent, the depressible switch for the thumb is located on a side of the mouse device. While the shape of a mouse pointing-input device is generally important in any design, the shape has virtually no impact on two of the most troublesome problems arising from the use of such devices: "Carpal Tunnel Syndrome" and "Repetitive Stress Syndrome." The presence of a depressible switch for the forefinger of the mouse device of the Gart '165 patent results in the users of the device being at risk for developing "Carpal Tunnel Syndrome" and "Repetitive Stress Syndrome." Moreover, with the mouse device of the Gart '165 patent (as with the Mouse Systems Scroll Mouse mouse device and the Logitech Cordless MouseMan Pro mouse device), the location of the depressive switch for the thumb on a side of the device means that pressing the switch would put lateral pressure on the mouse body, thus reducing stability and accuracy of the device, and, as a result, reducing productivity of the user.

III. SUMMARY OF THE INVENTION

Accordingly, it is an object of the present invention to provide a computer pointing-input device that can be held in a natural grip position.

It is another object to provide a computer pointing-input device that can be used by a typical computer operator for extended periods of time without suffering substantially any fatigue or pain in the fingers, hand, wrist or arm.

It is a further object of the present invention to provide a safe and operationally productive computer pointing-input device that can be used by a computer operator for extended periods of time.

It is yet another object of the present invention to provide a computer pointing-input device that can be effectively used by an individual with one or more missing or unusable fingers.

It is a still further object of the present invention to provide a computer pointing-input device that can be effectively used by an individual with mild to moderate nervous system disorders that cause shaking of the hands such as, but not limited to, Parkinson's disease.

It is an object of the present invention to provide a computer pointing-input device that is directionally stable and is essentially not subject to sideways displacement due to switch activation by a force applied in a plane parallel to the surface on which the computer pointing-input device is moved in operation.

One embodiment of the present invention capable of accomplishing the foregoing objects is a computer pointing-input device comprising a housing with a generally flat lower surface for slidable contact with a surface on which the computer pointing-input device is slidably translated in operation, and a curved upper surface for gripping by a user's palm when the user's hand is partially opened. In operation, a first lateral end of the computer pointing-input device aligns with the thumb of a hand of the user and a second lateral end aligns with an outer edge of the palm of the user's hand, generally opposite to the thumb position. Each of the first and second lateral ends have a corresponding first and second switch mounted therein, located on the upper surface of the computer pointing-input device. The first switch located at the first lateral end of the computer pointing-input device is in facing contact with a lower side of the user's thumb when the user's palm is resting on the curved upper surface of the computer pointing-input device. The first switch may be operated by a downward motion of the user's thumb. The second switch located at the second lateral end of the computer pointing-input device may be operated by the outer edge of the user's palm generally opposite to the user's thumb with a generally downward motion.

An alternative embodiment of the present invention capable of accomplishing the foregoing objects is a computer pointing-input device comprising a housing with a generally flat lower surface for slidable contact with a surface on which the computer pointing-input device is slidably translated in operation, and a curved upper surface for gripping by a user's palm when the user's hand is partially opened. In operation, a first lateral end of the computer pointing-input device aligns with the thumb of a hand of the user and a second lateral end aligns with an outer side of the palm of the user's hand, generally opposite to the thumb position.

Extending generally outward at the first lateral end of the housing of the alternative embodiment of the computer pointing-input device of the invention are a lower extension and an upper extension. The lower extension and upper extension form a notch that comfortably accepts the user's thumb. The lower extension has an upper surface and the upper extension has a lower surface. In operation, the upper surface of the lower extension and the lower surface of the upper extension are in facing contact, respectively, with the lower side and opposite upper side of the user's thumb. At least one of a first switch and a second switch is mounted respectively in the upper surface of the lower extension and the lower surface of the upper extension, so that switch-state input signals to the computer can be generated by a generally vertical movement of the user's thumb upward or downward. Preferably, both the first switch and the second switch are provided. At the second lateral end of the housing there may be mounted in the upper surface of the housing a third switch. The third switch may be actuated by a generally downward pressure exerted by an outer side of the user's palm. A thumb-wheel input device may also be mounted in a vertex formed by an intersection of the upper and lower extensions located at the first lateral end of the alternative embodiment of the computer pointing-input device of the invention. A thumb wheel of the thumb-wheel input device has a rotational axis which is oriented with a rotational axis generally normal to the plane of the surface on which the computer pointing-input device is slidably translated in operation so that rotational movement of the thumb wheel occurs in a plane generally parallel to the plane on which the computer pointing-input device is slidably translated in operation.

From the description above, a number of advantages of the preferred embodiments of the present invention become evident. Preferably, switches on the computer pointing-input device of the present invention are actuated by muscles located in the hand, in contrast to finger switch actuation generally required for conventional mouse pointing-input devices. Operation of such conventional mouse devices involve use of muscles located in the arm. In particular, the muscles used to actuate any of the thumb-actuated switches of preferred embodiments of the invention are primarily located around the thumb itself, thus eliminating virtually all movement through the carpal tunnel, such as generally required by operation of a conventional mouse pointing-input device. The muscles used to actuate any of the switches of preferred embodiments of the invention actuated by the edge of the palm generally opposite to the thumb are primarily located in the edge of the hand, once again requiring little, if any, movement through the carpal tunnel. In contrast, the primary muscles required to actuate the finger controls of a conventional computer pointing-input device are located in the upper forearm by the elbow. The conventional arrangement requires motion from the elbow region, through the carpal tunnel, and into the hand.

Preferred embodiments of the computer pointing-input device of the invention having three or more controls allow for the programming of additional functionality into the controls, thus eliminating complicated and/or stressful combination "Click" events which would be required with conventional two-switch computer pointing-input devices.

The lateral position with which preferred embodiments of the present invention are held is a more natural grip as compared to the angled grip required to use many conventional mouse pointing-input devices. The natural grip used in operating preferred embodiments of the pointing-input device of the invention tends to make for a comfortable and relaxed work session even with protracted periods of use.

An operator with a mild to moderate shaking disorder of the hands will ordinarily be able to use preferred embodiments of the present invention successfully due to the combination of a main body which is shaped and contoured to be grasped comfortably by the operator's hand in a lateral position and the lack of finger-actuated controls. Successful operation in spite of a shaking disorder such as Parkinson's disease is due to a phenomenon, whereby a person with such a disorder can grasp an object in the hand and, with a slight squeeze, the shaking will stop. With a conventional mouse pointing-input device, the fingers are generally elongated across the surface of the device, and any involuntary shaking will tend to involuntarily actuate one or more of the finger-actuated switches.

IV. BRIEF DESCRIPTION OF THE DRAWINGS

The above and other objects and advantages of this invention will be apparent upon consideration of the following detailed description taken in conjunction with the accompanying figures in which:

FIG. 1 is a perspective view from a high left oblique position of a first preferred embodiment of a computer pointing-input device made in accordance with the invention;

FIG. 2 is a rear view of the computer pointing-input device of FIG. 1;

FIG. 3 is a top view of the computer pointing-input device of FIG. 1;

FIG. 6 is a top view of the computer pointing-input device of FIG. 5;

FIG. 7 is a rear view of the computer pointing-input device of FIG. 5;

FIG. 11 is a perspective view from a high left oblique position of a fifth preferred embodiment of the computer pointing-input device of the invention;

FIG. 12 is a left side view of the computer pointing-input device of FIG. 11; and FIG. 13 is a front view of the computer pointing-input device of FIG. 11.

V. DETAILED DESCRIPTION OF THE PREFERRED EMBODIMENTS

Figure 4:
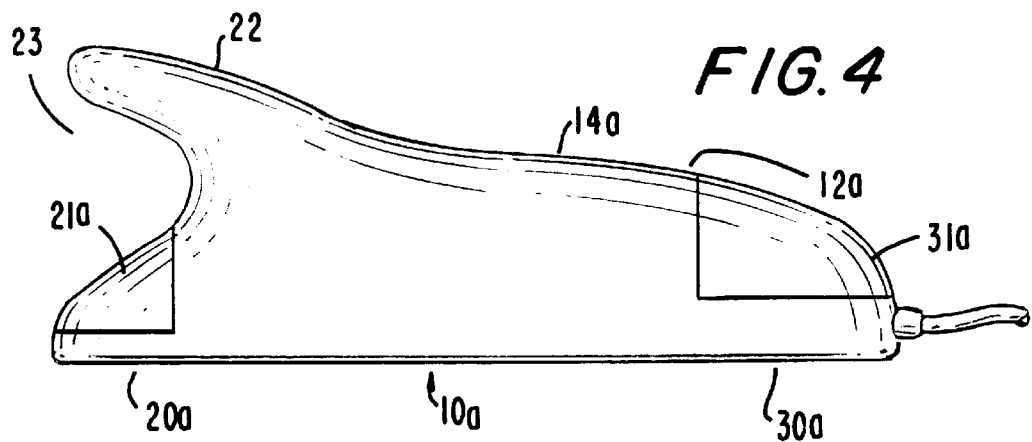
FIG. 4 is a rear view of a second preferred embodiment of the computer pointing-input device of the invention.

Preferred embodiments of the invention shown in the accompanying figures and described herein are configured for use with the right hand. However, it will be understood that the invention can readily be configured for use with the left hand by simply providing a mirror image version of the right hand configuration. Furthermore, it will be understood that the present invention relates only to the physical configuration of the computer pointing-input device, and not to its electrical or computer interface functions, both of which are well known in the art.

A. First Preferred Embodiment

Turning first to FIGS. 1–3, a first preferred embodiment of the computer pointing-input device 10 of the invention has a housing 12 which includes a main body portion 16, a first lateral end 20 and a second lateral end 30. In use, the first lateral end 20 of the computer pointing-input device 10 aligns with a thumb of a user's hand [not shown] and the second lateral end 30 aligns with an outer edge of the palm of the hand, generally opposite to a thumb position. The first lateral end 20 has a first switch 21 mounted therein, located on an upper surface 14 of the first computer pointing-input device 10. The second lateral end 30 has a second switch 31 mounted therein located on the upper surface 14. The first switch 21 located at the first lateral end 20 of the computer pointing-input device 10 is in facing contact with the lower side of a user's thumb during operation, and may be actuated by a generally downward motion of a user's thumb. The second switch 31 located at the second lateral end 30 of the computer pointing-input device 10 may be operated by the outer edge of the user's palm generally opposite to the user's thumb.

The manner of using the computer pointing-input device is to grasp main body portion 16 in the hand with the thumb positioned over the first switch 21. The fingers wrap across the top and down the front of main body portion 16.

B. Second Preferred Embodiment

Turning now to FIG. 4, a second preferred embodiment of the computer pointing-input device 10a of the invention is constructed similarly to the first embodiment of the device 10 illustrated in FIGS. 1–3 and discussed above, with the exception that extending generally laterally and upward from an upper surface 14a of a housing 12a at a first lateral end 20a of the computer pointing-input device 10a is an upper extension 22. The upper extension 22 forms a notch 23 between the upper extension 22 and the first lateral end 20a of the housing 14a. In operation, the notch 23 comfortably accepts a user's thumb and provides additional stability during operation. Elements of the second embodiment of the device 10a of the invention shown in FIG. 4 which correspond to elements of the first embodiment of the device 10 shown in FIGS. 1–3 are given corresponding reference numerals with a suffix "a."

C. Third Preferred Embodiment

Figure 5:
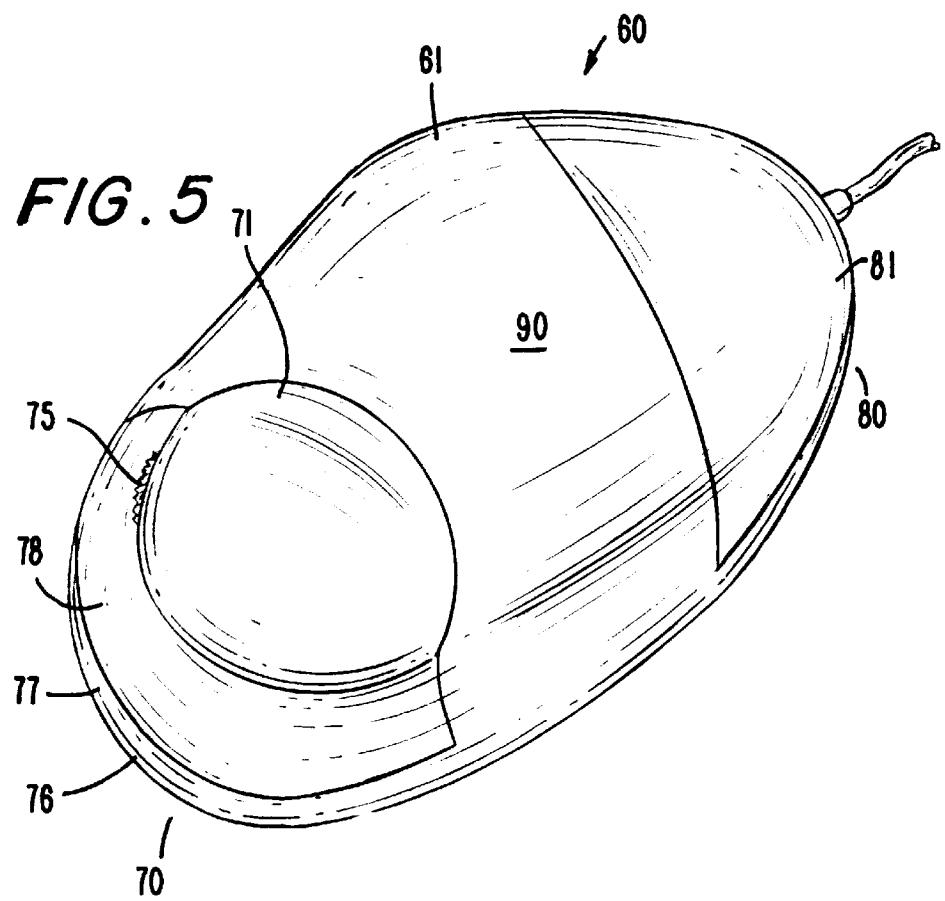
FIG. 5 is a perspective view from a high left oblique position of a third preferred embodiment of the computer pointing-input device of the invention.

Turning now to FIG. 5, a third preferred embodiment of the computer pointing-input device 60 of the invention has a housing 61 with a first lateral end 70 and a second lateral end 80. In operation, the palm [not shown] of the user rests on a central body portion 90 of the pointing input device 60. Positioned at the second lateral end 80 opposite to the first lateral end 70 of the housing 61 is a hand switch 81 which may be actuated by a side of the palm of the user generally opposite to the position of the thumb.

As shown best in FIG. 7, extending generally laterally outward and upward from the first lateral end 70 is an upper extension 71. Extending generally laterally outward from a bottom of the housing 61 at the first lateral end 70 is a lower extension 76. A notch 79 is formed by the lower extension 76 and the upper extension 71, which can accommodate the thumb [not shown] of a user. The lower extension 76 and the upper extension 71 join to form a vertex 74. Located in the vertex 74 is a thumb wheel input device 75, which may used to control scrolling and other functions of a computer [not shown] with which the pointing-input device 60 communicates. The lower extension 76 has an upper surface 77 in which a lower thumb switch 78 is mounted. The upper extension 71 has a lower surface 72 in which is mounted an upper thumb switch 73.

Figure 8:
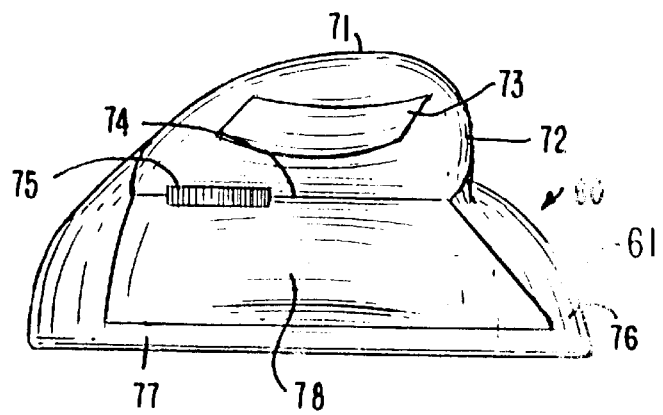
FIG. 8 is a left side view of the computer pointing-input device of FIG. 5.
Figure 9:
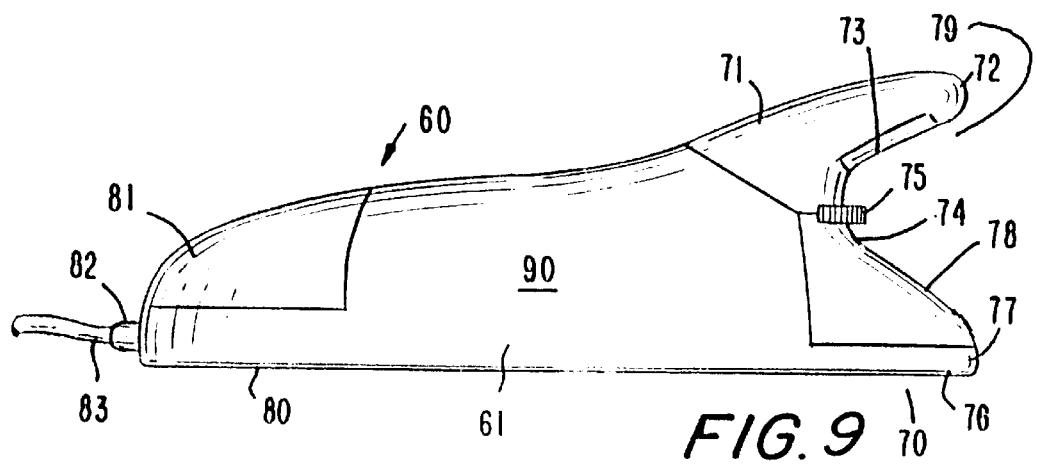
FIG. 9 is a front view of the computer pointing-input device of FIG. 5.

As may be seen in FIG. 8, the lower thumb switch 78 covers most of the upper surface 77 of the lower extension 76 and the upper thumb switch 73 covers most of the lower surface 72 of the upper extension 71. The thumb-wheel input device 75 is positioned left of center in the vertex 74 formed by the meeting of the upper extension 71 and the lower extension 76, as may be seen in FIGS. 7, 8, and 9.

As shown in FIG. 6, a portal 82 is located in the second lateral end 80 for a control cable 83 connected to the computer [not shown].

With the hand positioned properly, the operator would slidably translate the computer pointing-input device 60 of the invention as with any conventional mouse pointing-input device. The operation of the lower thumb switch 78 requires a single downward motion of the thumb. The operation of upper thumb switch 73 requires a single upward motion of the thumb. The operation of thumb wheel 75 can take two forms: 1) moving the thumb in a front to rear or rear to front motion causes the wheel to "roll" to generate a control signal useful for controlling scrolling in the computer, for example; and 2) a single inward squeeze of the thumb will depress the wheel and generate a "Click" event. The operation of the hand switch 81 requires a single downward motion of the outer edge of the hand.

D. Fourth Preferred Embodiment

Figure 10:
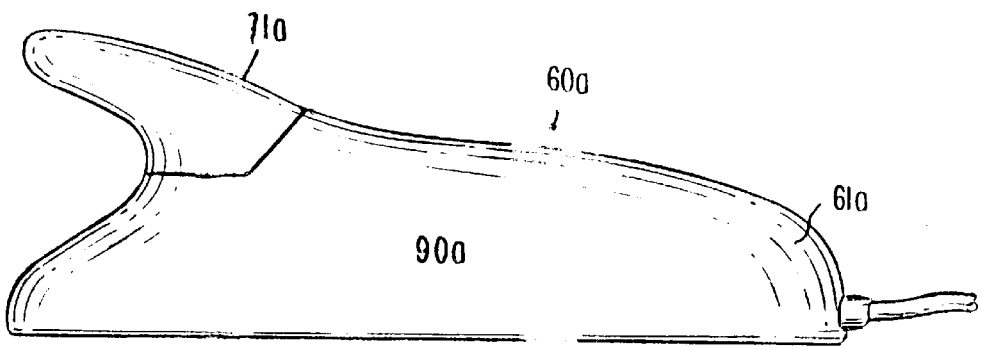
FIG. 10 is a rear view of a fourth preferred embodiment of the computer pointing-input device of the invention.

FIG. 10 depicts a fourth embodiment of the computer pointing-input device 60a of the invention which is constructed similarly to the third embodiment of the device 60 illustrated in FIGS. 5–9 and described above, with the exception that an upper extension 71a of the fourth embodiment of the device 60a is pivotally attached at a base to a main body portion 90a. The upper extension 71a rotates about the pivot attachment to actuate a switch apparatus in the base. Optionally, the switch mounted in the base of the upper extension 71a may have two switch-states, wherein a first of said switch states is actuated by a generally vertically upward motion of the user's thumb, and a second of said switch-states is actuated by a generally downward motion of the user's hand at the base of the index finger.

E. Fifth Preferred Embodiment

FIGS. 11–13 depict a fifth preferred embodiment of the computer pointing-input device 60b of the invention which is constructed similarly to the third embodiment of the device 60 illustrated in FIGS. 5–9 and described above, except that an eraser head switch-input device 91 is substituted for the scrolling wheel input device 75.

The fifth preferred embodiment of the computer pointing-input device 60b of the invention has a housing 61b with a first lateral end 70b and a second lateral end 80b. Positioned at the second lateral end 80b opposite to the first lateral and 70b of the housing is a hand switch 81b which may be actuated by a side of the palm of the user generally opposite to the position of the thumb.

As shown best in FIG. 13, extending generally laterally outward and upward from the first lateral end 70b is an upper extension 71b. Extending generally laterally outward from a bottom of the housing 61b at the first lateral end 70b is a lower extension 76b. A notch 79b is formed by the lower extension 76b and the upper extension 71b, which can accommodate the thumb [not shown] of a user. The lower extension 76b and the upper extension 71b join to form a vertex 74b. Located in the vertex 74b is the eraser-head input device 91 which may be used to control scrolling and other functions of a computer [not shown] with which the pointing-input device 60b communicates. The lower extension 76b has an upper surface 77b in which a lower thumb switch 78b is mounted. The upper extension 71b has a lower surface in which an upper thumb switch 73b is mounted.

Thus it is seen that a computer pointing-input device that significantly reduces the effort and bio-mechanical stress encountered by a user is provided. Persons skilled in the art will appreciate that the present invention can be practiced by other than the described preferred embodiments, which are presented for the purposes of illustration and not of limitation, and the present invention is therefore limited only by the claims that follow.

I claim:

1. A computer pointing-input device for generating pointing-input and switch-state control signals for communication to a computer responsive to slidable translation of the device on a flat surface and switch actuation by a user, the computer pointing-input device comprising:

(a) a housing having a generally flat bottom surface for slidable contact with the flat surface on which in operation the computer pointing-input device is slidably translated, and a curved upper palm-rest surface shaped to conform generally to the shape of a human palm when the human hand is partially opened, said housing having a first lateral end positioned to align with the thumb of a hand of the user in operation, and a second lateral end positioned to align in operation with an outer side of the palm of the user's hand at a position generally opposite to the thumb;

(b) a first switch mounted in said curved upper palm-rest surface at said first lateral end, the first switch being positioned to align in facing contact with the lower side of the user's thumb when the user's hand is grasping said computer pointing-input device, said switch being operable by a generally downward vertical movement of the user's thumb; and (c) a second switch mounted in said curved upper palm-rest surface at said second lateral end, the second switch being positioned to align in facing contact with the outer side of the palm of the user's hand generally opposite to the thumb, said second switch being operable by a generally downward vertical movement of the outer side of the user's palm.

2. A computer pointing-input device for generating pointing-input and switch-state control signals for communication to a computer responsive to slidable translation of the device on a flat surface and switch actuation by a user, the computer pointing-input device comprising:

(a) a housing having a generally flat bottom surface for slidable contact with the flat surface on which in operation the computer pointing-input device is slidably translated, and a curved upper palm-rest surface shaped to conform generally to the shape of a human palm when the human hand is partially opened, said housing having a first lateral end positioned to align with the thumb of the hand of the user in operation, and a second lateral end positioned to align in operation with an outer side of the palm of the user's hand at a position generally opposite to the thumb;

(b) a lower extension that extends generally laterally outward from the first lateral end of said housing;

(c) an upper extension extending generally laterally outward and upward from the first lateral end of said housing, said upper and lower extensions forming a notch shaped to accommodate the user's thumb in operation, said lower extension having an upper surface shaped and positioned to align in facing contact with a lower side of the user's thumb in operation and said upper extension having a lower surface shaped and positioned to align in facing contact with an upper side of the user's thumb in operation;

(d) a primary thumb switch mounted in one of said upper surface of said lower extension and said lower surface of said upper extension, said primary thumb switch being operable by movement of the user's thumb in at least approximately a vertical plane generally perpendicular to the surface on which the computer pointing-input device is slidably translated in operation; and (e) at least one element from a set including (i) a secondary thumb switch Mounted in the other of said upper surface of said lower extension and said lower surface of said upper extension than which the primary thumb switch is mounted, so that said upper surface of said lower extension and said lower surface of said upper extension both have thumb switches mounted therein for actuation by the at least approximately vertical movement of the user's thumb (ii) a thumb-wheel input device located in a vertex formed by the intersection of the upper extension and the lower extension located at the first lateral end of said computer pointing-input devices a thumb wheel of the thumb wheel input device having a rotational axis which extends generally perpendicular to the plane of the surface on which the computer pointing-input device is slidably translated in operation:

(iii) a palm switch mounted in the curved upper palm-rest surface at said second lateral end of said computer point-input device for operation by the outer side of the user's palm at the position generally opposite from the user's thumb;

(iv) an eraser head switch-input device located in a vertex formed by the intersection of the upper extension and lower extension located at the first lateral end of said computer pointing-input device; and (v) said upper extension is pivotally attached to said housing, said computer pointing-input device having a switch mounted in said housing, having two switch-states, wherein a first of said switch-states is actuated by the user's thumb moving generally vertically upward and wherein a second of said switch states is actuated by a generally downward movement of the user's hand at the base of the index finger.

* * * * *